US008671911B2

(12) United States Patent
Moren et al.

(10) Patent No.: US 8,671,911 B2
(45) Date of Patent: Mar. 18, 2014

(54) DUAL FUEL ENGINE SYSTEM AND METHOD OF OPERATING

(71) Applicant: Westport Power Inc., Vancouver (CA)

(72) Inventors: Mats Moren, Goteborg (SE); Anders Johansson, Kallered (SE)

(73) Assignee: Westport AB, Gothenburg (SE)

( * ) Notice: Subject to any disclaimer, the term of this patent is extended or adjusted under 35 U.S.C. 154(b) by 0 days.

(21) Appl. No.: 13/872,136

(22) Filed: Apr. 28, 2013

(65) Prior Publication Data

US 2013/0255628 A1 Oct. 3, 2013

Related U.S. Application Data

(63) Continuation of application No. PCT/SE2011/051283, filed on Oct. 27, 2011.

(30) Foreign Application Priority Data

Oct. 29, 2010 (SE) ........................................ 1051135

(51) Int. Cl.
*F02D 43/04* (2006.01)
*F02D 19/08* (2006.01)
*F02D 45/00* (2006.01)

(52) U.S. Cl.
USPC ........................ 123/406.29; 123/305; 123/575

(58) Field of Classification Search
USPC ............ 123/406.29, 305, 304, 575, 1 A, 299
See application file for complete search history.

(56) References Cited

U.S. PATENT DOCUMENTS

| 2,050,978 | A | * | 8/1936 | Thatcher | 123/575 |
| 6,257,200 | B1 | * | 7/2001 | Worth | 123/305 |
| 2004/0139943 | A1 | | 7/2004 | Kern et al. | |
| 2005/0161017 | A1 | | 7/2005 | Warlick | |
| 2007/0157912 | A1 | | 7/2007 | Ritter et al. | |

FOREIGN PATENT DOCUMENTS

| EP | 1923556 A1 | 5/2008 | |
| JP | 2007032578 A | * 2/2007 | ............. F02D 19/08 |
| JP | 2007247569 A | 9/2007 | |
| WO | 2011128692 A1 | 10/2011 | |

OTHER PUBLICATIONS

International Search Report and Written Opinion of the International Searching Authority issued on Feb. 17, 2012, in connection with International Application No. PCT/SE2011/051283.
International Preliminary Report on Patentability issued on Apr. 30, 2013, in connection with International Application No. PCT/SE2011/051283.

* cited by examiner

*Primary Examiner* — Hieu T Vo
(74) *Attorney, Agent, or Firm* — Corridor Law Group, P.C.

(57) ABSTRACT

A dual fuel engine operates on a gaseous fuel and a liquid fuel. The engine comprises a supply of gaseous fuel controlled by a first valve, a supply of compression ignitable liquid fuel controlled by a second valve, a control unit for controlling the supply of gaseous fuel and liquid fuel to each combustion chamber in the engine, and at least one knock sensor arranged to detect knock in each combustion chamber and to transmit an output signal proportional to the detected level of knock to the control unit. If knock is detected, the amount of gaseous fuel injected will be reduced while the amount of liquid fuel will be increased. The engine control system will subsequently adapt to the lower grade fuel and perform a calibration to operate as close as possible to the knock limit for the particular fuel.

19 Claims, 3 Drawing Sheets

DUAL FUEL ENGINE SYSTEM AND METHOD OF OPERATING

CROSS-REFERENCE TO RELATED APPLICATION(S)

This application is a continuation of International Application No. PCT/SE2011/051283 having an international filing date of Oct. 27, 2011, entitled "Dual Fuel Engine System". The '283 international application claimed priority benefits, in turn, from Swedish Patent Application No. 1051135-0 filed on Oct. 29, 2010. The '283 international application is hereby incorporated by reference herein in its entirety.

FIELD OF THE INVENTION

The present invention relates generally to dual fuel engine systems. More particularly, the present invention relates to an injection system for controlling the injection of a gaseous fuel into an air intake of a diesel engine.

BACKGROUND OF THE INVENTION

Due to the high thermal efficiency achieved by compression-ignited engines (for example, in comparison with spark-ignited engines), these engines are commonly utilized in industrial applications. The high efficiency of compression-ignited engines, such as diesel engines, is due in part to the ability to use higher compression ratios than spark-ignited engines (such as gasoline engines) as well as the ability to control power output without a throttle. In the latter regard, the lack of a throttle eliminates throttling losses of premixed charges typical in spark-ignited engines thereby resulting in significantly higher efficiency at partial load. However, compression-ignited engines and diesel engines in particular typically cannot achieve the low oxides of nitrogen (NOx) and particulate emission levels that are possible with spark-ignited engines. Diesel engines typically inject diesel fuel into the engine's combustion chamber when that chamber's piston is near the end of the compression stroke. The high pressure present in the chamber ignites the diesel fuel. Due to this mixing controlled nature of diesel combustion, a large fraction of the fuel exists at a very fuel-rich equivalence ratio. That is, the fuel and air in the combustion chamber are not necessarily a homogenous mixture. This can result in incomplete combustion of the diesel fuel, which tends to result in high particulate emissions. Furthermore, the fuel-rich equivalence ratio can also lead to high flame temperatures in the combustion process, which results in increased NOx emissions.

As tougher environmental standards are being enacted for diesel sources, users of diesel engines are looking for ways to lower emissions. One solution is to reduce the amount of diesel injected into the combustion chamber, which reduces the equivalence ratio and works to reduce particulate and NOx emissions; however, it also reduces engine power. In order to reduce particulate and NOx emissions levels from diesel engines, such engines can also be partially or completely converted for use with gaseous fuels such as, compressed natural gas (CNG), liquid natural fuels (LNG) such as ethanol, and liquid or liquefied petroleum gas (LPG), such as propane. Utilization of such gaseous fuels with diesel engines not only provides for more complete combustion and thereby enhanced fuel economy, but also typically results in lower engine emissions. However, gaseous fuels typically do not have the cetane value required to allow for their ignition through compression. Accordingly, diesel engines must be modified to use such fuels.

Methods for converting a diesel engine to consume gaseous fuels typically fall into three categories. The first is to convert the engine to a spark-ignited engine. A second is to convert the engine to allow for the direct injection of gaseous fuels into the combustion chamber with injected diesel. A third is a dual-fuel technology, in which the gaseous fuel is mixed with all or a portion of the intake air of the engine. The second and third methods utilize injected diesel (namely, pilot diesel) to ignite the gaseous fuel. In this regard, the combustion of the gaseous fuel results in more complete combustion of the diesel. Furthermore, as the gaseous fuel allows the engine to produce additional power, less diesel fuel is injected into the cylinders Conversion to a spark-ignition system and/or a direct gaseous fuel injection system for utilizing gaseous fuels with a diesel engine each typically require substantial modification to the diesel engine. Such modifications can include replacement of cylinder heads, pistons, fuel injection system and/or duplication of many engine components (for example, injection systems). Accordingly, these systems are typically expensive and oftentimes unreliable. On the other hand, dual-fuel systems require little modification to existing engines. Dual-fuel operation, in which gaseous fuels are mixed with intake air prior to the introduction of that air into the engine, is known in the art as injection. According to one method, gaseous fuel is injected in an intake channel and/or an intake port for each cylinder. This is commonly termed "gaseous fuel port injection" and can comprise 1-2 injectors per cylinder. According to a further method, gaseous fuel is injected in a mixer unit, which can be located before or after the throttle, or at the entrance to an intake pipe. The latter case is common if a throttle is not used. This method is commonly termed "mixer injection" or "central mixer" and can comprise 4-12 injectors in the mixer unit.

The mixture of gaseous fuel and intake air is introduced into each cylinder of the engine during the intake stroke. During the compression stroke of the piston, the pressure and temperature of the mixture are increased. Near the end of the compression stroke, a small quantity of pilot diesel fuel from the engine's existing diesel fuel injection system is injected into the cylinder. The pilot diesel ignites due to compression and in turn ignites the mixture of gaseous fuel and intake air. Such injection systems can be retrofitted onto existing diesel engines with little or no modification of the existing engine. Furthermore, engines using such injection systems can typically be operated in a dual-fuel mode or in a strictly diesel mode (for example, when gaseous fuel is not available).

Dual-fuel systems have suffered a number of disadvantages that have prevented widespread use of such systems. The first disadvantage is typically encountered at high load operating conditions when elevated temperature and pressure in the engine during the compression strokes makes the intake air/gaseous fuel mixture susceptible to premature detonation or knocking. Furthermore, at such high loads, some gaseous fuels (for example, natural gas) lack the thermal energy (namely, BTUs) required to maintain a desired power output of the engine. Another limitation can be availability of air from a turbocharger due to increased boosting pressure from the added gaseous fuel volume. Overcoming these disadvantages may involve reducing gaseous fuel content in order to reach desired engine power, redesigning the boost system or limiting engine performance. Another disadvantage is encountered at low engine load, where the gaseous fuel and air mixture may be too lean for satisfactory combustion. In this instance, fuel consumption can actually increase, as can the emissions of hydrocarbons (namely, unburned gaseous fuels) and particulates.

A further disadvantage is related to impurities or pollutants in the gaseous fuel. A dual fuel engine is usually configured to operate using a fuel having a certain quality. If a substandard or lower grade gaseous fuel is injected, this will invariably cause knocking. Each of these problems can be broadly termed a gaseous fuel metering problem of a gaseous fuel flow volume to the engine.

The above noted disadvantages are particularly acute in diesel engines, which run at varying load levels during operation. Such engines require the volume of gaseous fuel injected into the intake airflow to vary with the varying requirements or demands of the engine in order to maintain desired power and emission outputs.

U.S. Patent Application Publication No. 2007/125321 discloses a dual fuel engine mainly intended for stationary use, in which a knock sensor is used for controlling the engine and the supply of gaseous fuel. In order to avoid a loss of power if knock is detected, the gaseous fuel is immediately reduced to zero or near zero and the amount of diesel is increased correspondingly. The amount of gas is then increased gradually to a lower level than the original. This method of operation will have noticeable effects on engine noise and behavior. This type of engine control is impractical for vehicular applications, where the engine will be subjected to numerous transients and changes in power requirements.

The present dual fuel engine system has control functionality that can be installed on engines in vehicles, for transient engine operation. The present dual fuel engine system reduces emissions of NOx and particulates from the engine. In the present system, gaseous fuel is provided to a diesel engine based on the varying requirements or demands of the engine, and operation of the engine on different grades of gaseous fuels is enabled.

SUMMARY OF THE INVENTION

One or more of the foregoing shortcomings is overcome by a dual fuel engine system and a method for operating the system.

The present dual fuel engine system is operable on a gaseous fuel and a liquid fuel. The engine comprises a supply of gaseous fuel controlled by a first valve, a supply of compression ignitable liquid fuel controlled by a second valve, a control unit controlling the supply of gaseous fuel and liquid fuel to each combustion chamber in the engine, and at least one knock sensor arranged to detect knock in each combustion chamber and to transmit an output signal proportional to the detected level of knock to the control unit.

The control unit is operative to receive the output signal from the at least one knock sensor and to compare the output signal to at least a first threshold value. If the output signal exceeds the first threshold value then the control unit is arranged to generate a control signal operative to control the first valve to reduce the first gaseous fuel flow volume by a predetermined amount and to retard the ignition timing. On the other hand, if the output signal is equal to or less than the first threshold value, then the control unit is arranged to generate a control signal operative to retard the ignition timing.

The threshold value stored or supplied to the control unit is dependent on the quality of the gaseous fuel for which the engine is calibrated. This calibration can be adapted for various markets or countries in which the engine is to be used. For instance, a basic calibration can be made for G20, which is a substantially clean, non-polluted CNG fuel. If the user for some reason fills the gas tank with lower grade gaseous fuel, or if pollutants enter the air intake or fuel injection system, then the engine will automatically adapt to these conditions. In this way the engine can be optimized for operation with a maximum amount of gaseous fuel, which will reduce the use of liquid fuels such as diesel and minimize the emission of $CO_2$ and soot.

If the engine is operated on lower grade gaseous fuel, then knock will be detected and the amount of gaseous fuel injected will be reduced while the amount of liquid fuel will be increased. As will be described below, the engine control system will subsequently adapt to the lower grade fuel and perform a calibration to operate as close to the knock limit for the particular fuel as possible.

When the output signal exceeds the first threshold value, the control unit is arranged to generate a control signal operative to control the first valve to reduce the first gaseous fuel flow volume by 5-25%. The degree of volume reduction can be dependent on the detected knock level, but can also be based on knowledge of the typical grades of fuel available in the region or country when the engine is operated. For instance, if it is known that the available fuels are relatively high grade, the first gaseous fuel flow volume can be reduced by, for instance, 5-10%. On the other hand, if larger variations in fuel quality are encountered, then the first gaseous fuel flow volume can be reduced by 10-25%. In this way the amount of gaseous fuel used can be maximized over the use of liquid fuel.

If the output signal exceeds the first threshold value, then the control unit is simultaneously arranged to generate a control signal operative to retard the ignition timing for an immediately subsequent ignition. The interval for ignition timing retardation can be selected within an interval of 2-6 degrees crank angle (CA). The selection of a suitable step for ignition timing retardation can be proportional to the level of knock detected by the at least one knock sensor.

As stated above, the control unit is provided with a base calibration for a reference gaseous fuel with known knocking properties. Depending on the available types of gaseous fuel, the adjustment interval for retarding the ignition timing can vary with the gaseous fuel and their knock properties.

A dual fuel engine can be operated on any suitable compression ignitable liquid fuel, such as diesel and biodiesel, also known as rapeseed oil methyl ester (RME).

Suitable gaseous fuels are, for instance, intake system injected fuels such as compressed natural gas (CNG), liquid natural gas (LNG), CNG-hydrogen mixtures, hydrogen, liquid pressurized gas (LPG), dimethyl ether (DME) or biogas. All of these fuels may not be in gaseous form in the fuel lines between the tank and an injector, but they will be in gaseous form after injection.

A method of operating a dual fuel engine involves an engine operable on a gaseous fuel and a liquid fuel. As set forth above, the engine comprises a supply of gaseous fuel controlled by a first valve, a supply of compression ignitable liquid fuel supply controlled by a second valve, a control unit for controlling the supply of gaseous fuel and liquid fuel to each combustion chamber in the engine, and at least one knock sensor arranged to detect knock in each combustion chamber and to transmit an output signal proportional to the detected level of knock to the control unit The method involves the steps of:
 detecting knock in a combustion chamber;
 transmitting an output signal proportional to the level of knock to the control unit;
 comparing the output signal to at least a first threshold value; and (a) if the output signal exceeds the first threshold value:
   generating a control signal to control the first valve
      reducing the first gaseous fuel flow volume by a predetermined amount; and
      retarding the ignition timing; or
(b) if the output signal is equal to or less than the first threshold value:
   generating a control signal for retarding the ignition timing.

If the output signal exceeds the first threshold value the method involves generating a control signal to control the first valve proportional to the detected output signal level. In this way, the reduction of the first gaseous fuel flow volume can be reduced in response to the severity of the knock level in order to maximize the use of gaseous fuel.

When the output signal exceeds the first threshold value the first gaseous fuel flow volume can be reduced by between 5 and 25%. The reduction can be a set value or be proportional to the detected output signal level. In the latter case, the reduction is dependent on the severity of the knock level. The level of the set value can, for instance, be dependent on available fuel grades, as described above.

When the first gaseous fuel flow volume is reduced in response to the output signal exceeding the first threshold value, the control unit is simultaneously arranged to generate a control signal operative to retard the ignition timing for an immediately subsequent ignition.

Once the engine control system has adapted to the lower grade fuel and knock is no longer detected, the control system will perform a calibration to operate as close to the knock limit for the particular fuel as possible. This is achieved by gradually increasing the gaseous fuel flow volume and/or advancing the ignition timing towards the basic calibration. Such adjustments are performed until knock is yet again detected, in order to determine the knock limit for the fuel currently being used. As long as the engine control system has been unable to return to the basic calibration, the system can regularly perform a re-calibration, for instance, at start-up, after re-fuelling and/or at predetermined time or mileage intervals.

The method of operating the dual fuel engine, in order to calibrate the engine to maximize the amount of gaseous fuel, involves monitoring the output signal from the at least one knock sensor. If knock is not detected for a predetermined period of time or a number of combustion cycles, for example 10-25 combustion cycles, the control unit performs the steps of:
   determining the first gaseous fuel flow volume and
   comparing the first gaseous fuel flow volume to a reference value; and
(a) if the first gaseous fuel flow volume is equal to the reference value:
   determining if the current ignition timing is later than a reference ignition timing; and if this is true;
   advancing the ignition timing towards the reference timing; and
(b) if the first gaseous fuel flow volume is less than the reference value:
   determining if the current ignition timing is later than a reference ignition timing; and if this is true;
   advancing the ignition timing towards the reference timing; and
   increasing the first gaseous fuel flow volume by a predetermined amount, that is less than the previous reduction of the first gaseous fuel flow volume.

The foregoing method enables the engine to return to its basic calibration once it is operated on the standard or high grade gaseous fuel for which it was originally intended. When advancing the ignition timing towards the reference timing, this can be done in steps of 0.5-2 degrees CA, depending on the relative amount of adjustment selected for the previous retardation. Similarly, the increase of the first gaseous fuel flow volume is effected by a predetermined amount, that is less than the previous reduction of the first gaseous fuel flow volume. The increase can be made in steps 1-5%, depending on the relative amount of adjustment selected for the previous reduction of fuel flow. In both cases, the stepwise adjustment can be made in equal steps towards the basic calibration. Alternatively, the adjustment can involve larger initial steps, which are gradually reduced as the values approach the basic calibration.

In a vehicle provided with the present dual fuel engine system as described above, the engine can be operated according to the foregoing method.

In the present dual fuel engine system, the control system adapts the operation of the engine from combustion cycle to combustion cycle, which allows substantially instantaneous adaptation to different grades of gaseous fuel irrespective of whether the current engine operation is transient or not.

The present dual fuel engine system reduces emissions of $CO_2$, NOx and particulates, such as soot, from the engine by allowing the vehicle/engine to be operated on a larger portion of gas than would be possible using conventional engines.

The present dual fuel engine system provides gaseous fuel to a diesel engine based on the varying requirements or demands of the engine and enables operation of the engine on different grades of gaseous fuels. The engine can adapt continuously to the current fuel grade used and maximize the use of gaseous fuel over diesel or similar liquid fuel.

DETAILED DESCRIPTION OF PREFERRED EMBODIMENT(S)

Figure 1:
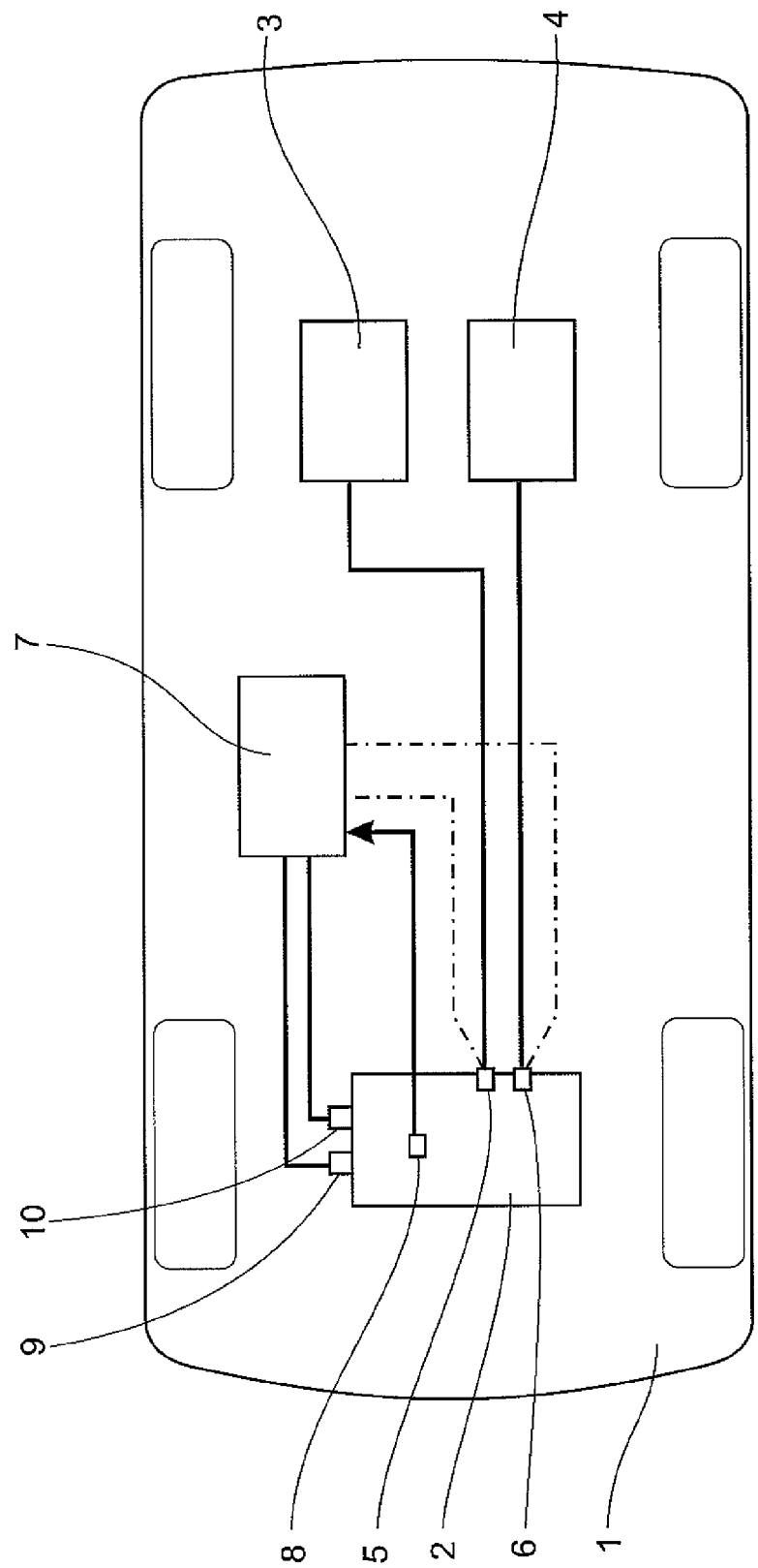
FIG. 1 schematically illustrates a vehicle provided with a dual fuel engine system as described herein.

FIG. 1 schematically illustrates a vehicle 1 provided with a dual fuel engine 2. Dual fuel engine 2 is operable on a gaseous fuel drawn from a first tank 3 and on a compression ignitable liquid fuel drawn from a second tank 4. Engine 2 comprises at least one combustion chamber (not shown), which is supplied with gaseous fuel controlled by a first valve 5, in the form of a first controllable injector, connected to first tank 3. Each combustion chamber is further supplied with liquid fuel controlled by a second valve 6, in the form of a second controllable injector, connected to second tank 4. First controllable injector 5 can be placed in an air intake conduit of the combustion chamber, while second controllable injector 6 can be arranged to inject fuel directly into the combustion chamber. Alternatively, the first and second controllable injectors can be combined into a common dual fuel injector, preferably but not necessarily arranged to inject fuel directly into the combustion chamber.

Controllable injectors 5, 6 are controlled by a control unit 7, arranged to transmit signals to the respective injector for controlling the relative amounts of gaseous fuel and liquid fuel to each combustion chamber in the engine. Engine 2 is provided with at least one knock sensor 8 (only one indicated) arranged to detect knock in each combustion chamber and to transmit an output signal proportional to the detected level of knock to control unit 7. In addition, control unit 7 is connected to further sensors for detecting various engine related parameters, such as a sensor for engine speed 9, and is also arranged to transmit control signals to further actuators, such as an ignition timing controller 10.

Control unit 7 is operative to receive an output signal from knock sensor 8 and to compare the output signal to at least a first threshold value. If the output signal exceeds the first threshold value then the control unit is arranged to generate a control signal operative to control the first valve to reduce the first gaseous fuel flow volume by a predetermined amount and to retard the ignition timing. On the other hand, if the output signal is equal to or less than the first threshold value, then the control unit is arranged to generate a control signal operative to retard the ignition timing.

Methods for controlling the dual fuel engine will be described in further detail with reference to FIGS. 2A and 2B, which show schematic flow charts illustrating a number of steps carried out by a method of operating the present dual fuel engine system.

Figure 2A:
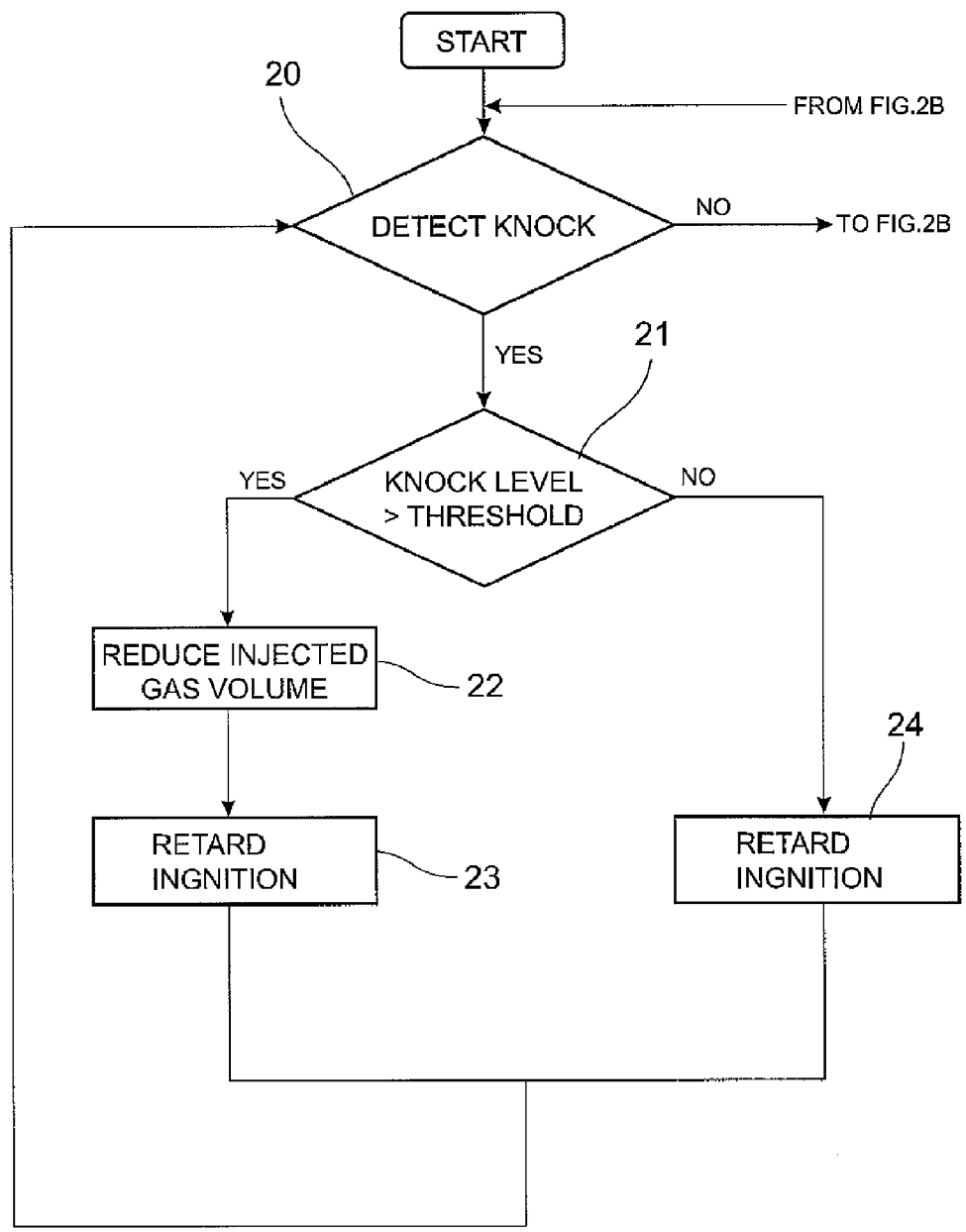
FIGS. 2A and 2B are schematic flow charts illustrating a method of operating the dual fuel engine system described herein.

FIG. 2A shows a method for controlling a dual fuel engine being operated on a gaseous fuel, or a mixture of gaseous and liquid fuel, in which a change in composition or deterioration of the gaseous fuel drawn from the first tank is experienced. The method involves monitoring the engine combustion chambers to detect (block 20) if knock is occurring in a combustion chamber. If no knock is detected over a predetermined time or a predetermined number of combustion cycles, the control unit will check if an adjustment of injected gas volume and/or ignition timing has been carried out and if it is still in operation. This procedure is described in connection with FIG. 2B below.

If knock is detected, then an output signal proportional to the level of knock is transmitted to the control unit. The control unit will compare (block 21) the output signal to at least a first threshold value. If the output signal exceeds the first threshold value, then the control unit will generate a control signal to control the first valve to reduce (block 22) the first gaseous fuel flow volume by a predetermined amount and to retard (block 23) the ignition timing. If the output signal does not exceed the first threshold value, then the control unit will generate a control signal to control the first valve to retard (block 24) the ignition timing. When the output signal exceeds the first threshold value the first gaseous fuel flow volume can be reduced by between 5 and 25%. The reduction can be a set value or be proportional to the detected output signal level. In the latter case, the reduction is dependent on the severity of the knock level. Similarly, the retardation of the ignition timing can be a set value or be proportional to the detected output signal level. The level of the set value can, for instance, be dependent on available fuel grades, as described above.

The method will then return to monitoring the one or more combustion chambers to detect (block 20) if knock is still occurring in a combustion chamber. If knock is still occurring, then the above control cycle is repeated. If no knock is detected (block 20) over a predetermined time or a predetermined number of combustion cycles, for example over 10-20 combustion cycles, the control unit will assume that the engine has adapted to the lower grade fuel. The control unit will perform a calibration to enable the engine to operate as close to the knock limit for the particular fuel grade as possible.

Figure 2B:
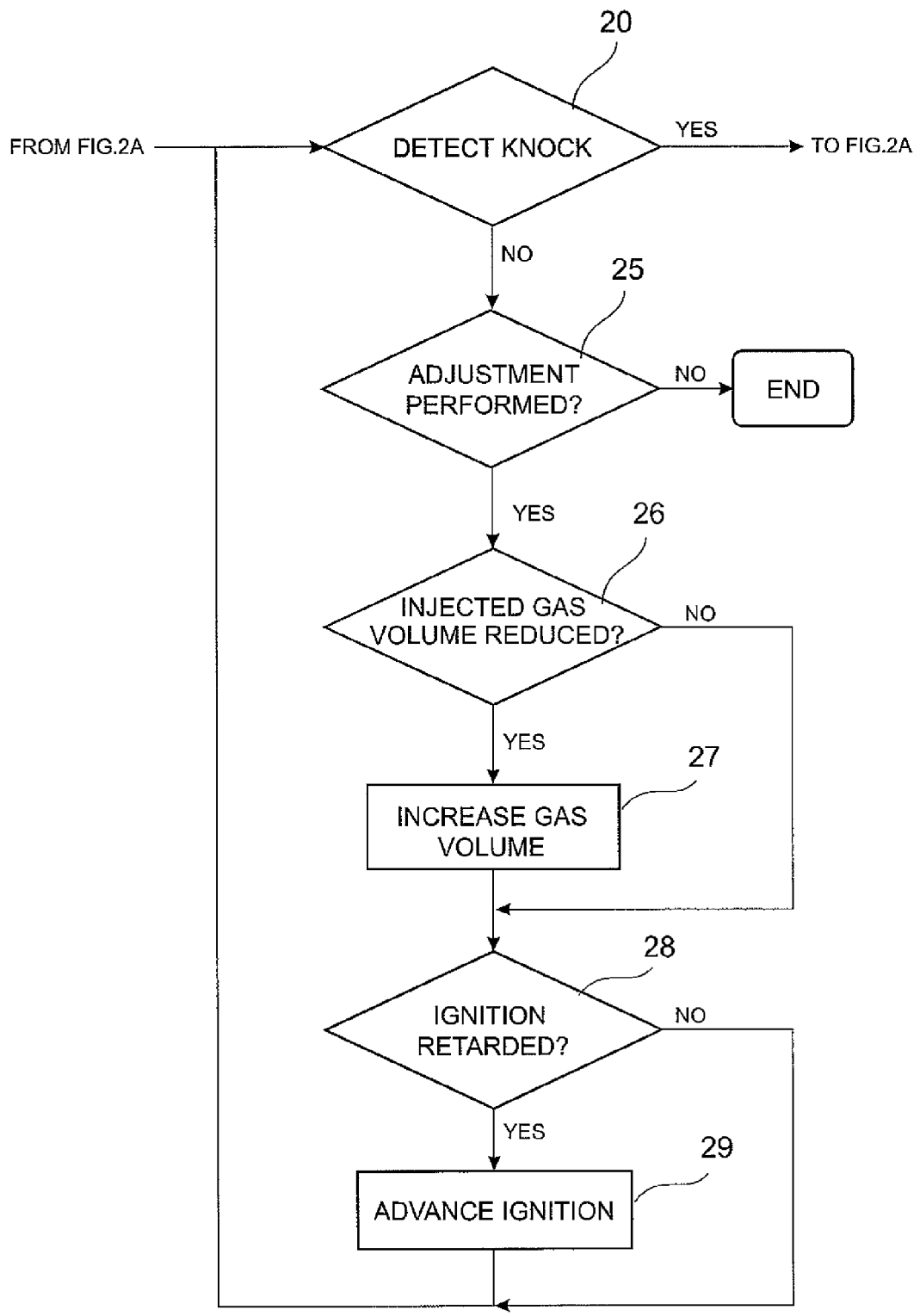

This regulation is described in FIG. 2B. If no knock is detected (block 20) over a predetermined time or a predetermined number of combustion cycles, the control unit will check if an adjustment has been performed (block 25). If no adjustment has been carried out prior to the predetermined time or the predetermined number of combustion cycles, then the control unit assumes that the engine is operating normally and the control cycle ends. The control unit then returns to monitor the engine for knocking conditions.

If knock is not detected over the predetermined time or the predetermined number of combustion cycles the control unit and an adjustment has been carried, then the control unit performs a control, or re-calibration cycle. The control unit will first determine (block 26) if the first gaseous fuel flow volume has been reduced, by comparing the first gaseous fuel flow volume to a reference value.

If the first gaseous fuel flow volume is equal to the reference value the control unit will determine (block 28) if the current ignition timing is later than a reference ignition tinning If this is true the ignition timing is advanced (block 29) towards the reference timing. The adjustment of the timing will be performed in steps of 0.5 to 1 degrees CA.

If the first gaseous fuel flow volume is less than the reference value the control unit will increase (block 27) the first gaseous fuel flow volume by a predetermined amount, that is less than the previous reduction of the first gaseous fuel flow volume. The fuel flow volume can be increased as a percentage of the total reduction performed after a previously detected knock condition. Alternatively, the volume is increased by iteration towards the initial fuel flow volume used before a previously detected knock condition. Subsequently, the control unit will determine (block 28) if the current ignition timing is later than a reference ignition timing. If this is true the ignition timing is advanced (block 29) towards the reference timing, as indicated above.

The foregoing method enables the engine to return to its basic calibration once it is operated on the standard or high grade gaseous fuel.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A dual fuel engine system operable on a gaseous fuel and a liquid fuel, the system comprising:
   (a) a plurality of combustion chambers;
   (b) a supply of gaseous fuel controllable by a first valve;
   (c) a supply of compression ignitable liquid fuel supply controllable by a second valve;
   (d) a knock sensor capable of detecting knock in each of said combustion chambers and transmitting an output signal proportional to said detected level of knock;
   (e) a control unit capable of receiving said knock sensor output signal, comparing said output signal to at least a first threshold value, and controlling said supplies of gaseous fuel and liquid fuel to each of said combustion chambers, wherein said control unit:
      (i) generates a signal for controlling said first valve to reduce said first gaseous fuel flow volume by a predetermined amount and for retarding ignition timing when said knock sensor output signal exceeds said first threshold value,
      (ii) generates a signal for retarding ignition timing when said output signal is equal to or less than said first threshold value.

2. The dual fuel engine system of claim 1, wherein, when said knock sensor output signal exceeds said first threshold value, said first valve control signal effects a 5-25% reduction of said first gaseous fuel flow volume.

3. The dual fuel engine system of claim 1, wherein said control signal effects a retarding of ignition timing for an immediately subsequent ignition.

4. The dual fuel engine system of claim 1, wherein said control unit is provided with a base calibration for a reference gaseous fuel with known knocking properties.

5. The dual fuel engine system of claim 1, wherein said liquid fuel is at least one of a diesel fuel and a biodiesel fuel.

6. The dual fuel engine system of claim 1, wherein said gaseous fuel is at least one of compressed natural gas (CNG), liquid natural gas (LNG), CNG-hydrogen mixtures, hydrogen, liquid pressurized gas (LPG), dimethyl ether (DME) and biogas.

7. The dual fuel engine system of claim 1, wherein said engine system is incorporated into a vehicle.

8. In a dual fuel engine system operable on a gaseous fuel and a liquid fuel, said engine comprising a supply of gaseous fuel controlled by a first valve, a supply of compression ignitable liquid fuel supply controlled by a second valve, a control unit controlling the supply of gaseous fuel and liquid fuel to each combustion chamber in the engine, a knock sensor arranged to detect knock in each combustion chamber and to transmit an output signal proportional to the detected level of knock to the control unit, the improvement comprising:
said control unit operative to receive said output signal from said knock sensor, to compare said output signal to at least a first threshold value, and
if said output signal exceeds said first threshold value, said control unit being arranged to generate a control signal operative to control said first valve to reduce said first gaseous fuel flow volume by a predetermined amount and to retard the ignition timing, and
if said output signal is less than or equal to said first threshold value, said control unit being arranged to generate a control signal operative to retard said ignition timing.

9. The dual fuel engine system of claim 8, wherein, when said knock sensor output signal exceeds said first threshold value, said first valve control signal effects a 5-25% reduction of said first gaseous fuel flow volume.

10. The dual fuel engine system of claim 8, wherein said control signal effects a retarding of ignition timing for an immediately subsequent ignition.

11. The dual fuel engine system of claim 8, wherein said control unit is provided with a base calibration for a reference gaseous fuel with known knocking properties.

12. The dual fuel engine system of claim 8, wherein said liquid fuel is at least one of a diesel fuel and a biodiesel fuel.

13. The dual fuel engine system of claim 8, wherein said gaseous fuel is at least one of compressed natural gas (CNG), liquid natural gas (LNG), CNG-hydrogen mixtures, hydrogen, liquid pressurized gas (LPG), dimethyl ether (DME) and biogas.

14. The dual fuel engine system of claim 8, wherein said engine system is incorporated into a vehicle.

15. A method of operating a dual fuel engine system operable on a gaseous fuel and a liquid fuel, the system comprising a plurality of combustion chambers, a supply of gaseous fuel controllable by a first valve, a supply of compression ignitable liquid fuel supply controllable by a second valve, a knock sensor capable of detecting knock in each of said combustion chambers and transmitting an output signal proportional to the detected level of knock, and a control unit capable of receiving said knock sensor output signal, comparing said output signal to at least a first threshold value, and controlling said supplies of gaseous fuel and liquid fuel to each of said combustion chambers, said method comprising:
(a) detecting knock in at least one of said combustion chambers
(b) transmitting said output signal to said control unit;
(c) comparing said output signal to at least a first threshold value; and
(d) when said knock sensor output signal exceeds said first threshold value, generating a signal to control said first valve to reduce said first gaseous fuel flow volume by a predetermined amount and to retard ignition timing,
(e) when said output signal is equal to or less than said first threshold value, generating a signal to retard ignition timing.

16. The method of claim 15, wherein said control signal is generated to control said first valve in proportion to said knock sensor output signal level.

17. The method of claim 15, wherein, when said knock sensor output signal exceeds said first threshold value, said first valve control signal effects a 5-25% reduction of said first gaseous fuel flow volume.

18. The method of claim 17, wherein said first gaseous fuel flow volume is reduced by an amount proportional to said knock sensor output signal level.

19. The method of claim 15, further comprising:
(f) monitoring said knock sensor output signal, and when knock is not detected for a predetermined time period or a predetermined number of combustions:
(i) determining said gaseous fuel flow volume;
(ii) comparing said gaseous fuel flow volume to a gaseous fuel flow reference value;
(iii) when said gaseous fuel flow volume is equal to said gaseous fuel flow volume reference value, advancing ignition timing towards a reference ignition timing when ignition timing is later than said reference ignition timing; and
(iv) when said gaseous fuel flow volume is less than said gaseous fuel flow volume reference value, advancing ignition timing towards a reference ignition timing when ignition timing is later than said reference ignition timing and increasing said gaseous fuel flow volume by a predetermined amount that is less than a previous reduction of said first gaseous fuel flow volume.

* * * * *